(12) United States Patent
Nakane

(10) Patent No.: US 6,394,191 B1
(45) Date of Patent: May 28, 2002

(54) STRUCTURE FOR ACCOMMODATING A MOTOR

(75) Inventor: Shin-ichi Nakane, Okazaki (JP)

(73) Assignee: Makita Corporation, Anjo (JP)

( * ) Notice: Subject to any disclaimer, the term of this patent is extended or adjusted under 35 U.S.C. 154(b) by 0 days.

(21) Appl. No.: 09/561,807

(22) Filed: Apr. 28, 2000

(30) Foreign Application Priority Data

May 24, 1999 (JP) ............................................. 11-143952

(51) Int. Cl.[7] ................................................. E21B 19/18
(52) U.S. Cl. ......................................... 173/217; 310/239
(58) Field of Search .............................. 173/171, 217; 310/47, 239, 245, 247; 318/538, 541, 542

(56) References Cited

U.S. PATENT DOCUMENTS

| | | | | |
|---|---|---|---|---|
| 3,430,084 A | * | 2/1969 | Hall et al. | 310/242 |
| 3,691,407 A | * | 9/1972 | Klett et al. | 310/1 |
| 4,851,730 A | * | 7/1989 | Fushiya et al. | 310/239 |
| 4,855,631 A | * | 8/1989 | Sato et al. | 310/239 |
| 4,978,877 A | * | 12/1990 | Quirijnen | 310/239 |

FOREIGN PATENT DOCUMENTS

| | | |
|---|---|---|
| JP | 7-30572 | 6/1995 |
| JP | 10-29173 | 2/1998 |

* cited by examiner

*Primary Examiner*—Scott A. Smith
*Assistant Examiner*—Nathaniel Chukwurah
(74) *Attorney, Agent, or Firm*—Foley, Hoag & Eliot LLP

(57) ABSTRACT

A rechargeable impact screwdriver (1) includes a housing (2) and a brush holder (20). The brush holder (20) in turn includes a circular main holder body (21) and a bearing box (22) which contains a ball bearing and is coaxially and integrally formed with the main holder body (21). A pair of carbon brushes (25) is inserted into the bearing box (22) so as to come into pressing contact with a motor shaft (14) which is supported by the ball bearing of the a bearing box (22). The brush holder (20) is elastically supported within the housing (2) by four rubber pins (32) which are mounted in the main holder body (21) and in bosses (33) of the housing (2) on the opposite ends thereof.

8 Claims, 4 Drawing Sheets

STRUCTURE FOR ACCOMMODATING A MOTOR

This application claims priority on Japanese Patent Application No. 11-143952 filed on May 24, 1999, the contents of which are incorporated herein by reference.

BACKGROUND OF THE INVENTION

1. Field of the Invention

The present invention relates to structures for housing motors. More particularly, the present invention relates to a structure for housing in an electric power tool a motor, such as a DC motor or AC motor, that includes a stator, a rotator, and brushes.

2. Description of the Related Art

Various structures for accommodating a motor in an electric power tool have been proposed in recent years. For example, Japan Published Unexamined Patent Application No. 10-29173 discloses one such structure which includes a bearing for supporting the stator, a support element for supporting the bearing for the rotator, and another support element for supporting the brushes. Additionally, in order to prevent faulty commutation or a break in the wire due to vibration caused by rotation of the motor, this structure further includes elastic bodies, such as O-rings, on the bearing for the stator and the support element for the bearing.

Another structure for accommodating a motor in an electric power tool is disclosed in Japan Published Unexamined Utility Model Application No. 7-30572, in which a motor includes a rotator and a stator accommodated within the motor's casing. Furthermore, to prevent excessive vibration of the motor and its associated problems, elastic material, such as pieces of rubber, is interposed between the support element for the brushes and the lid of the casing.

While the foregoing structures partially achieve their intended objectives, they are not free from certain problems and inconveniences. For example, as each of the examples attempts to solve the problem of vibration by separately providing an elastic body for different motor elements, such as the support element for the bearing for the rotator and the support element for the brushes, the effect has proven limited. Particularly, the brushes and the rotator tend to vibrate in different phases, which may cause wobbling of the rotator with respect to the brushes. In turn, this often causes faulty commutation of the motor or even shortens the service life of the brushes.

SUMMARY OF THE INVENTION

In view of the above-identified problems, an important object of the present invention is to provide an improved structure for accommodating a motor in an electric power tool which minimizes vibration of the motor during operation.

Another object of the present invention is to provide an improved structure for accommodating a motor in an electric power tool which effectively prevents adverse effects on the commutation of the motor and prolongs the service life of the brushes.

The above objects and other related objects are realized by the invention, which provides an improved structure for accommodating a motor having a stator and a rotator. The structure comprises: a housing; a stator support for supporting the stator of the motor; a rotator bearing for supporting the rotator of the motor; a bearing support for supporting the rotator bearing; a brush holder for holding brushes for the motor, the brush holder being integrally formed with the bearing support, and elastic means interposed between the brush holder and the housing, the elastic means separating the brush holder and the bearing support from the housing while elastically supporting the brush holder and the bearing support within the housing.

In this structure, the brush holder and the bearing support are integrally formed and separated from the housing, whereas the elastic means between the brush holders and the housing elastically supports the integrated two elements. Therefore, the structure effectively reduces harmful vibration and prevents breakage in the wiring during the operation of the motor. This structure further allows the brush holder and the bearing support to vibrate substantially in the same phase, thus preventing wobbling motion of the bearing support with respect to the brush holder. Hence, proper commutation of the motor is ensured and the service life of the brushes are prolonged. Moreover, as the brush holder incorporates the bearing support, the rotator can be assembled with the bearing with a high degree of precision. Additionally, the integration of the bearing and the bearing support eliminates the need for providing separate elastic bodies, thus isolating vibration with a fewer number of elements.

According to one aspect of the present invention, the elastic means includes a plurality of cylindrical rubber pins.

According to another aspect of the present invention, each of the rubber pins has a first end and a second end, with the first end being fitted in an outer surface of the brush holder and the second end being fitted in an inner surface of the housing, thereby spatially separating the brush holder and the bearing support from the housing and concomitantly providing elastic support to the brush holder and the bearing support within the housing.

According to still another aspect of the present invention, the brushes have a common longitudinal axis and four mutually parallel rubber pins are oriented parallel to the longitudinal axis the brushes.

According to yet another aspect of the present invention, the housing has a longitudinal axis along which the stator of the motor is coaxially disposed, whereas the brush holder and the bearing support are generally circularly shaped and coaxially disposed about the axis of the housing.

According to one feature of the present invention, the structure further comprises at least one bridge for connecting the bearing support to the brush holder.

According to another feature of the present invention, the elastic means are adapted to allow the brush holder and the bearing support to vibrate in substantially the same phase during the operation of the motor.

According to still another feature of the present invention, the plurality of brushes are a pair of brushes removably mounted in the brush holders and the structure further includes a pair of brush caps removably attached to the brush holders for covering the brushes such that, when the brush caps are removed, the brushes are exposed for replacement.

Other general and more specific objects of the invention will in part be obvious and will in part be evident from the drawings and descriptions which follow.

BRIEF DESCRIPTION OF THE ATTACHED DRAWINGS

For a fuller understanding of the nature and objects of the present invention, reference should be made to the following detailed description and the accompanying drawings, in which.

DETAILED DESCRIPTION OF THE PREFERRED EMBODIMENT

A preferred embodiment according to the present invention will be described hereinafter with reference to the attached drawings.

Figure 1:
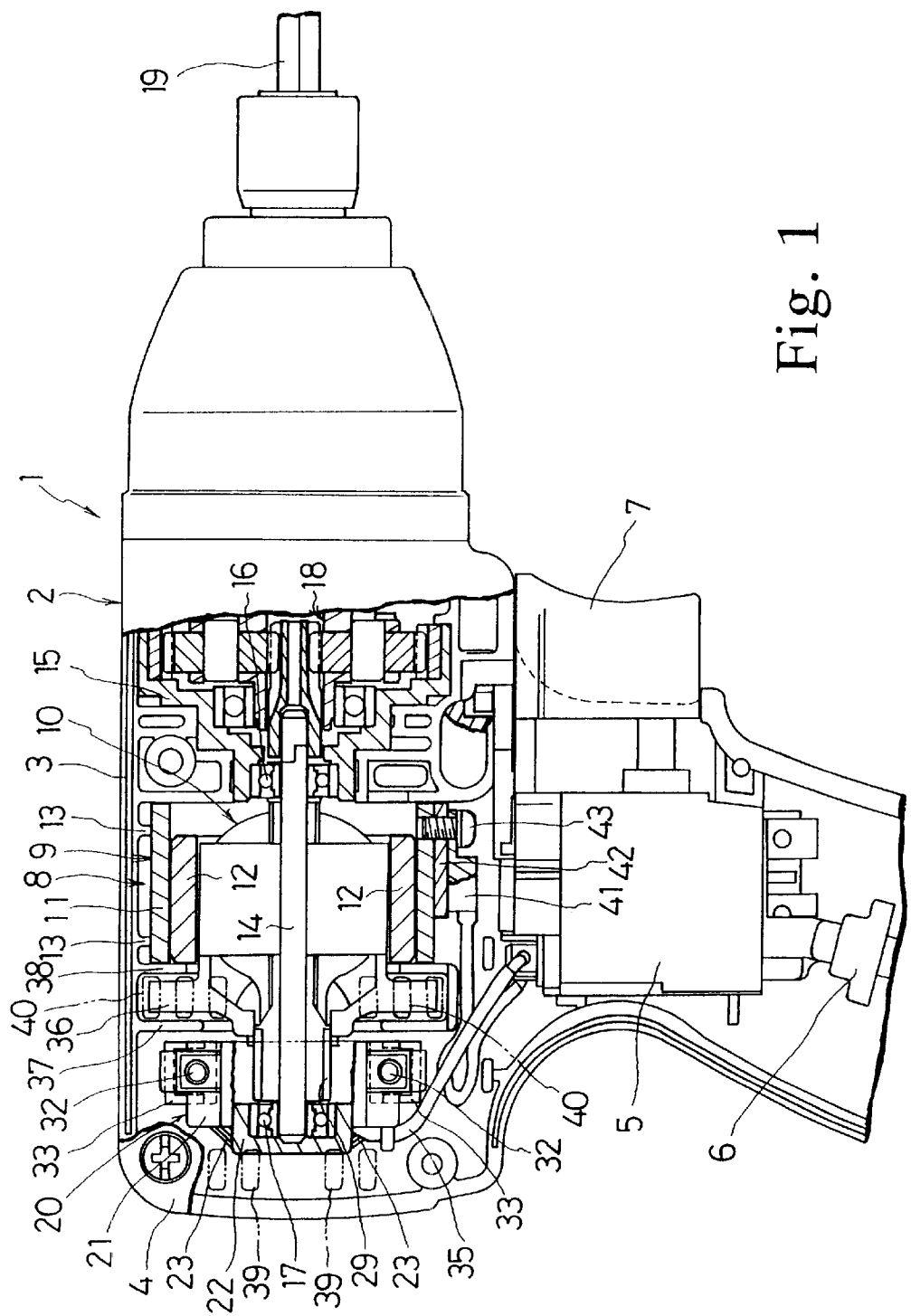
FIG. 1 is a partially cross-sectional view of a rechargeable impact screwdriver to which the present invention is applied, with part of its housing removed.
Figure 3:
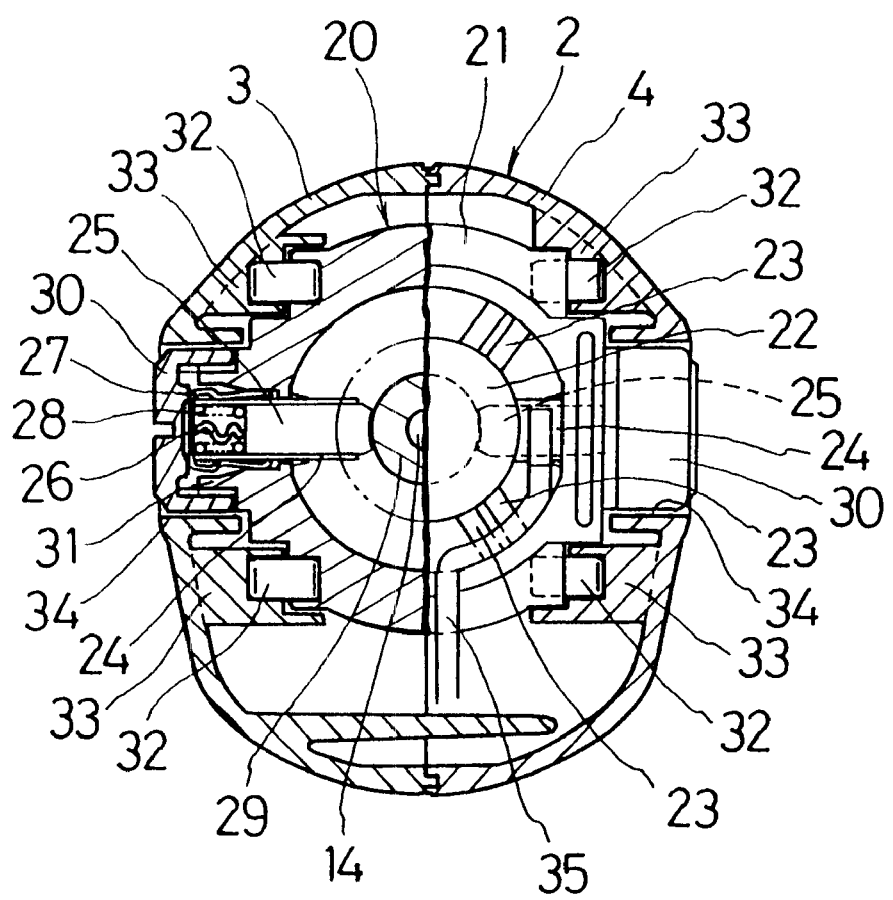
FIG. 3 is a cross section of the brush holder shown in FIG. 2.

FIG. 1 is a partially cross-sectional view of a rechargeable impact screwdriver 1 to which the present invention is applied, with part of its housing 2 removed. As shown in FIG. 3, the housing 2 includes right and left split casing halves 3 and 4 which are assembled with a plurality of screws. The impact screwdriver 1 further includes a switch 5, a battery holder 6 for holding a battery pack (not shown) detachably mounted in the lower portion of the housing 2, and a trigger switch 7 biased forward (to the right in FIG. 1).

The impact screwdriver 1 further includes a direct-current motor (DC motor) 8 which in turn includes a stator 9 and a rotator 10. The stator 9 includes a cylindrical yoke 11 and two permanent magnets 12 secured on the inner surface of the yoke 11. When the housing 2 is assembled, the DC motor 8 is supported by a stator support, such as ribs 13, protruding from the inner surface of the split casing halves 3 and 4. The rotator 10 includes a motor shaft 14 whose top end is supported by a ball bearing 16 clamped by a gear housing 15 which in turn is supported by the housing 2. The rear end of the motor shaft 14 is supported by a ball bearing 17 incorporated in a brush holder 20 (to be described in detail below). The rotation of the motor shaft 14 is transmitted to a tool bit 19 via an epicycle reduction gear 18 and an impact mechanism (not shown).

Figure 2:
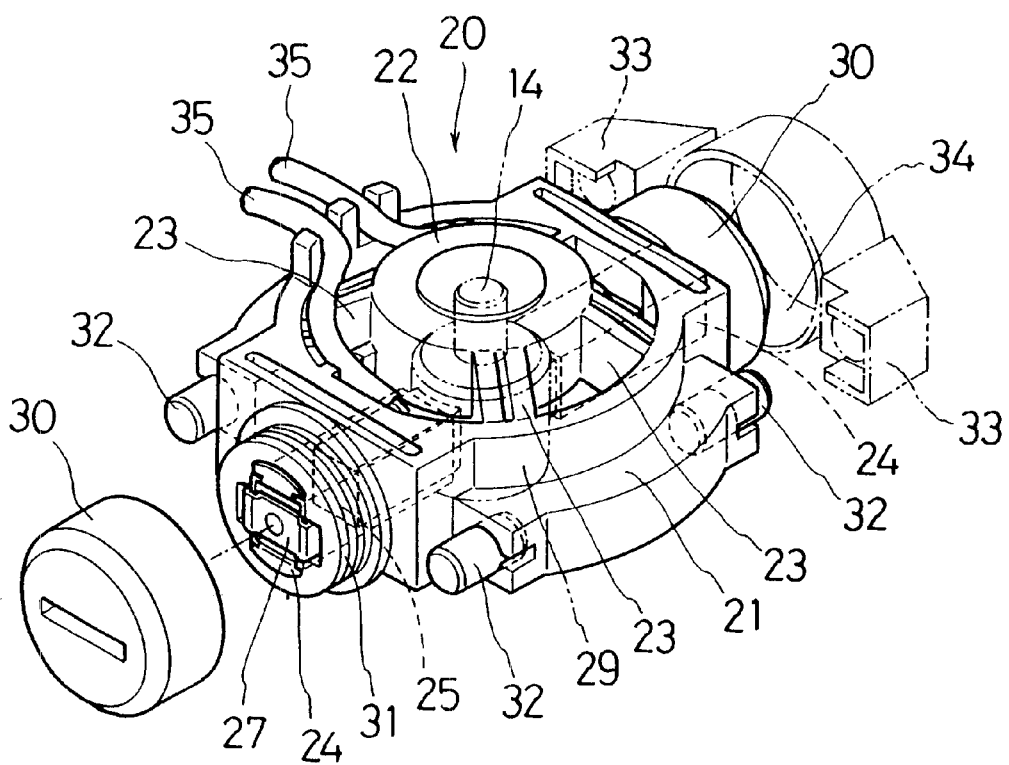
FIG. 2 is a perspective view of a brush holder of the rechargeable impact screwdriver shown in FIG. 1.

As also shown in FIGS. 2 and 3, the brush holder 20 includes a circular main holder body 21 and a bearing box 22 concentrically and integrally connected to the rear portion of the main holder body 21 by means of connector bridges 23. The bearing box 22 contains the ball bearing 17 for holding the rear end of the motor shaft 14 as described above. The main holder body 21 includes a pair of metal sleeves 24 which have a square cross section and are radially secured through the main holder body 21 diagonally opposite each other across the center of the main holder body. A carbon brush 25 is inserted in each metal sleeve 24. A brush cap 27 is connected to each carbon brush 25 via a pigtail 26, whereas a coil spring 28 is mounted between the brush cap 27 and the carbon brush 25. Accordingly, when a brush cap 27 is fitted in the outer end of the sleeve 24, the coil spring 28 biases the carbon brush 25 toward the center of the main holder body 21 into contact with a commutator 29 of the rotator 10. The brush holder 20 further includes a pair of holder caps 30 provided with internal threads which engage external threads 31 of the metal sleeves 24, thus covering the exposed portions of the sleeves 24. The carbon brushes 25 can be replaced by removing the holder caps 30 and exposing the brush caps 27.

Still referring to FIGS. 2 and 3, four elastic bodies, such as rubber pins 32, are fitted approximately halfway in the outer surfaces of the main holder body 21. As shown in FIG. 3, when the impact screwdriver 1 is assembled, the other halves of the pins 32 are fitted in bosses 33 formed on the inner surface of the split casing halves 3 and 4. In addition, the rubber pins 32 are disposed parallel to the carbon brushes 25 with each brush interposed halfway between two of the rubber pins. In this way, the brush holder 20 is elastically supported by the rubber pins 32 within the housing 2. Reference numeral 34 denotes through-holes provided in the split casing halves 3 and 4 for exposing the holder caps 30 of the brush holder 20, whereas reference numeral 35 denotes lead wires connecting the switch 5 to the metal sleeves 24.

Furthermore, referring again to FIG. 1, a cooling fan 36 is fitted on the rotator 10 between the brush holder 20 and the stator 9 and more particularly between baffles 37 and 38 provided on the inner surfaces of the split casing halves 3 and 4. When the impact screwdriver 1 is switched on, the fan 36 rotates to draw in air from the outside of the screwdriver 1 through air inlets 39 provided at the rear portion of the housing 2 and discharge the drawn air through air outlets 40 provided in the part of the housing 2 surrounding the fan 36, thus cooling the commutator 29 of the rotator 10.

Figure 4A:
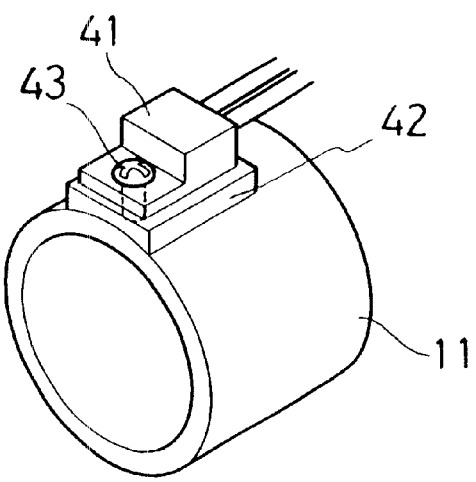
FIG. 4A is a perspective view of an FET element attached to a motor yoke of the rechargeable impact screwdriver shown in FIG. 1.
Figure 4B:
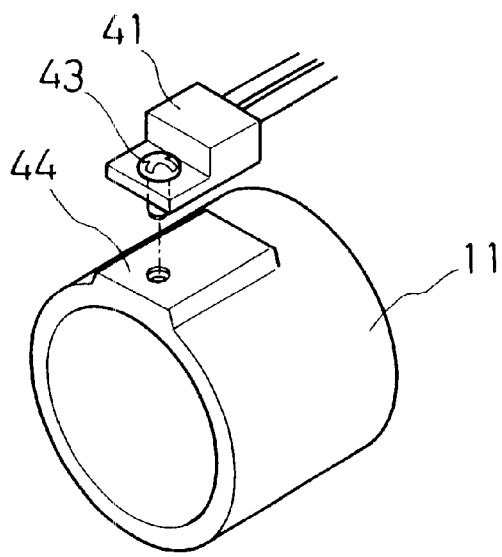
FIG. 4B shows an alternative manner of attaching the FET element of FIG. 4A to the motor yoke.
Figure 4C:
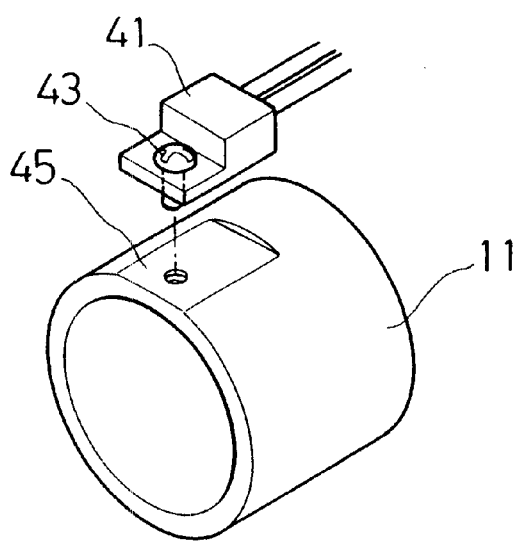
FIG. 4C shows another alternative manner of attaching the FET element of FIG. 4A to the motor yoke.

As shown in FIG. 4A, an FET element 41 connected to the switch 5 is attached to the lower part (as seen in FIG. 1) of the outer surface of the yoke 11 of the stator 9 by means of a mount 42 and a screw 43. This arrangement replaces a conventional radiator plate separately provided in this type of electric power tool by utilizing the yoke as radiator means so as to simplify the overall structure of the tool and contribute to reduction in weight and cost. As the purpose of the mount 42 is to facilitate the attachment of the FET element to the outer surface of the yoke 11, another means of attachment is possible, as shown in FIGS. 4A and 4B. In the example of FIG. 4A, the yoke 11 is formed with a rectangular platform 44 to replace the separate mount 42, whereas in FIG. 4B, a flat surface is chamfered on the yoke 11 such that the FET element can be placed and screwed thereto.

In the rechargeable impact screwdriver 1 thus constructed, the main holder body 21 for supporting the carbon brushes 25 and the bearing box 22 for supporting the ball bearing 17 are integrated into the brush holder 20. According to the embodiment, this integrated brush holder 20 is separately provided from the housing 2 of the screwdriver 1 while being elastically supported within the housing 2 by the rubber pins 32. This structure effectively prevents harmful vibration and breakage in the wiring of the screwdriver 1 and allows the brush holder 20 (the carbon brush 25) and the motor shaft 14 to vibrate in the same phase while the DC motor 8 is in operation. This prevents wobbling motion of the motor shaft 14 with respect to the brush holder 20, thus ensuring proper commutation of the motor and prolonging the service life of the carbon brush 25.

According to the foregoing embodiment, as the ball bearing 17 is incorporated in the brush holder 20, the motor shaft 14 can be assembled to the ball bearing with a high degree of precision. Additionally, the integration of the ball bearing 17 and the main holder body 21 eliminates the need for providing separate elastic bodies for the ball bearing and the main holder body, as has been required for conventional arrangements, thus attaining the important objective of vibration isolation with a fewer number of elements. In this embodiment, in order to support the brush holder 20 within the housing 2, only the bosses 33 need to be provided on the split casing halves 3 and 4 for receiving the rubber pins 32. Accordingly, the shape and structure of the housing remain relatively simple without taking up large space within the housing 2, thus leaving sufficient space for adding to the housing structure the baffles 37 and 38 for accommodating the cooling fan 36.

It should be noted that elastic bodies for supporting the brush holder 20 within the housing 32 are not limited to the rubber pins 32. Various shapes of rubber, such as O-rings or plates, may be provided around or on the main holder body 21 to serve the same purpose. Moreover, instead of using rubber for vibration isolation, coil springs, plate springs, or leaf springs may be interposed between the main holder body 21 and the housing 2 as long as the same effect is attained.

Furthermore, although the main holder body 21 and the bearing box 22 are integrated into the brush holder 20, a main holder body and a separate bearing box may be assembled as long as a similar high degree of precision can be maintained upon assembly. It should be noted that the present invention is also applicable to an AC motor. Moreover, the housing need not be a split half housing as in the foregoing embodiment.

It will thus be seen that the present invention efficiently attains the objects set forth above, among those made apparent from the preceding description. As other elements may be modified, altered, and changed without departing from the scope or spirit of the essential characteristics of the present invention, it is to be understood that the above embodiments are only an illustration and not restrictive in any sense. The scope or spirit of the present invention is limited only by the terms of the appended claims.

What is claimed is:

1. A structure for accommodating a motor having a stator and a rotator, the structure comprising:

a housing;

a stator support for supporting the stator of the motor;

a rotator bearing for supporting the rotator of the motor;

a bearing support for supporting the rotator bearing;

a plurality of brush holders for holding brushes for the motor, the plurality of brush holders being integrally formed with the bearing support, and elastic means interposed between the plurality of brush holders and the housing, the elastic means separating the plurality of brush holders and the bearing support from the housing while elastically supporting the plurality of brush holders and the bearing support within the housing.

2. A structure in accordance with claim 1, wherein the elastic means includes a plurality of cylindrical rubber pins.

3. A structure in accordance with claim 2, wherein each of the rubber pins has a first end and a second end, the first end being fitted in an outer surface of the brush holder and the second end being fitted in an inner surface of the housing, thereby spatially separating the brush holder and the bearing support from the housing and concomitantly providing elastic support to the brush holder and the bearing support within the housing.

4. A structure in accordance with claim 3, wherein the brushes have a common longitudinal axis and four mutually parallel rubber pins are oriented parallel to the longitudinal axis of the brushes.

5. A structure in accordance with claim 1, wherein the housing has a longitudinal axis along which the stator of the motor is coaxially disposed, and further wherein the brush holder and the bearing support are generally circularly shaped and coaxially disposed about the axis of the housing.

6. A structure in accordance with claim 1 further comprising at least one bridge for connecting the bearing support to the brush holder.

7. A structure in accordance with claim 1, wherein the elastic means are adapted to allow the brush holder and the bearing support to vibrate in substantially the same phase during the operation of the motor.

8. A structure in accordance with claim 1, wherein the plurality of brushes are a pair of brushes removably mounted in the brush holders and the structure further comprising a pair of brush caps removably attached to the brush holders for covering the brushes such that, when the brush caps are removed, the brushes are exposed for replacement.

* * * * *